US010025741B2

United States Patent
Kim et al.

(10) Patent No.: US 10,025,741 B2
(45) Date of Patent: Jul. 17, 2018

(54) SYSTEM-ON-CHIP, MOBILE TERMINAL, AND METHOD FOR OPERATING THE SYSTEM-ON-CHIP

(71) Applicant: Samsung Electronics Co., Ltd., Suwon-si (KR)

(72) Inventors: Jae-Youl Kim, Yongin-si (KR); Chih Jen Lin, Austin, TX (US); Jinook Song, Seoul (KR); Sungjae Lee, Seoul (KR); Hyun-ki Koo, Seongnam-si (KR); Donghyeon Ham, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 14/995,179

(22) Filed: Jan. 13, 2016

(65) Prior Publication Data

US 2017/0199835 A1    Jul. 13, 2017

(51) Int. Cl.
| | |
|---|---|
| *G06F 13/00* | (2006.01) |
| *G06F 13/36* | (2006.01) |
| *G06F 13/40* | (2006.01) |
| *G06F 13/16* | (2006.01) |
| *G06T 1/20* | (2006.01) |

(52) U.S. Cl.
CPC ...... *G06F 13/4036* (2013.01); *G06F 13/1605* (2013.01); *G06T 1/20* (2013.01); *G06F 2213/16* (2013.01); *G06F 2213/36* (2013.01); *G06T 2200/28* (2013.01)

(58) Field of Classification Search
None
See application file for complete search history.

(56) References Cited

U.S. PATENT DOCUMENTS

| | | | |
|---|---|---|---|
| 6,189,140 | B1 | 2/2001 | Madduri |
| 6,877,112 | B1 | 4/2005 | Iino et al. |
| 8,069,373 | B2 | 11/2011 | Vorbach |
| 8,464,032 | B2 | 6/2013 | Henry et al. |
| 8,566,484 | B2 | 10/2013 | Satterfield et al. |
| 8,639,981 | B2 | 1/2014 | Chong |
| 8,694,830 | B2 | 4/2014 | Balkan et al. |
| 9,037,911 | B2 | 5/2015 | Rentschler et al. |

(Continued)

FOREIGN PATENT DOCUMENTS

| | | |
|---|---|---|
| CN | 102253859 | 11/2011 |
| EP | 2333668 | 6/2011 |

*Primary Examiner* — Michael Sun
(74) *Attorney, Agent, or Firm* — H.C. Park & Associates, PLC

(57) ABSTRACT

A system-on-chip (SoC) to perform a deadlock control on a processor of the SoC, the SoC including the processor including a plurality of central processing unit (CPU) cores, a first bus connected to the processor, a graphic processing unit (GPU) connected to the first bus, a memory controller connected to the first bus, a second bus connected to the processor, an isolation cell including a logic circuit configured to retain a signal value input to the processor according to an isolation signal, and a deadlock controller connected to the first bus and the second bus. The deadlock controller is configured to isolate the processor, which is in a deadlock state, from the first bus by applying the isolation signal on the isolation cell, and to extract, via the second bus, state information of the isolated processor in the deadlock state.

20 Claims, 13 Drawing Sheets

(56) References Cited

U.S. PATENT DOCUMENTS

| | | | |
|---|---|---|---|
| 2003/0200425 A1* | 10/2003 | Swoboda | G06F 9/3005 712/229 |
| 2010/0332909 A1* | 12/2010 | Larson | G06F 11/3476 714/40 |
| 2014/0143463 A1 | 5/2014 | Mou et al. | |
| 2014/0281722 A1 | 9/2014 | Kraipak et al. | |
| 2016/0179585 A1* | 6/2016 | Berger | G06F 15/17325 719/313 |
| 2016/0188519 A1* | 6/2016 | Wagh | G06F 13/4265 710/105 |
| 2017/0091108 A1* | 3/2017 | Arellano | G06F 12/0888 |

* cited by examiner

CPU core state after CPU reset

Deadlock state information recoverable from data stored in internal memory

☐ : Recoverable CPU data

SYSTEM-ON-CHIP, MOBILE TERMINAL, AND METHOD FOR OPERATING THE SYSTEM-ON-CHIP

FIELD

Example embodiments relate to a system-on-chip (SoC) and method for operating the system-on-chip, and more particularly, to an SoC and method for securing processor state information of a processor in a deadlock state.

BACKGROUND

Application processors (APs) are used in various mobile devices, such as smartphones, tablet computers, notebook computers, navigational devices, and the like. An AP may be implemented as a system-on-chip (SoC), which is a single electronic chip in which a complex electronic system includes various circuits, functional blocks, memory, logic, etc.

An SoC may include one or more processors to control the system and various SoC components including intellectual property (IP) blocks controlled by the one or more processors. The IP blocks may include various circuits, logic, or a combination thereof. The circuits and logic may include or be associated with code or at least one instruction. The IP blocks may include a master IP block and a slave IP block. IP blocks are connected together through transaction interfaces that enable data transfer. A time in which a transaction is pending may be a time between an SoC component that sends a request, e.g., the master IP block sending a request, and another SoC component that sends a response, e.g., the slave IP block sending a response.

During the course of operation, an SoC may fall into a deadlock state. For example, during a solution development process, a deadlock within an SoC may occur due to various reasons. The deadlock may include an inoperable state in which SoC components, e.g., IP blocks or other components in the SoC, within an SoC send a request and are unable to receive a response. For instance, a process or thread may enter a waiting state when a requested resource is held by another waiting process that is also waiting for another resource held by another waiting process. If a process is indefinitely unable to change its state, the system may be in a deadlock state. In some deadlock states, a processor, e.g., a host processor configured to execute an operating system (OS), may be in an operable state while an IP block is in a permanent pending state after transmitting a request. In other deadlock states, the processor may be in an inoperable state and all SoC components may be in a deadlock state. In at least some of these cases, it may be more difficult to analyze the cause of a deadlock state because SoC components and the one or more processors are in a deadlock state.

The above information disclosed in this Background section is only for enhancement of understanding of the background of the inventive concept, and, therefore, it may contain information that does not form the prior art that is already known to a person of ordinary skill in the art.

SUMMARY

One or more example embodiments provide an SoC, a mobile terminal including the SoC, and method for operating the SoC and extracting processor state information to perform a debugging process.

Additional aspects will be set forth in the detailed description which follows, and, in part, will be apparent from the disclosure, or may be learned by practice of the inventive concept.

According to one or more example embodiments, a system-on-chip (SoC) to perform a deadlock control on a processor of the SoC includes the processor of the SoC including a plurality of central processing unit (CPU) cores, a first bus connected to the processor, a graphic processing unit (GPU) connected to the first bus, a memory controller connected to the first bus, a second bus connected to the processor, an isolation cell including a logic circuit configured to retain a signal value input to the processor according to an isolation signal, and a deadlock controller connected to the first bus and the second bus. The deadlock controller is configured to isolate the processor, which is in a deadlock state, from the first bus by applying the isolation signal on the isolation cell, and extract, via the second bus, state information of the isolated processor in the deadlock state.

According to one or more example embodiments, a system-on-chip (SoC) to perform a deadlock control on a processor of the SoC includes the processor of the SoC, a main bus connected to the processor, a graphic processing unit (GPU) connected to the main bus, a memory controller connected to the main bus, a debugging path bus connected to the processor, and a deadlock controller connected to the debugging path bus. The deadlock controller is configured to detect a deadlock state of the processor, reset the main bus, and extract state information of the processor in the deadlock state.

According to one or more example embodiments, a mobile terminal including a system-on-chip (SoC) to perform a deadlock control on a processor of the SoC includes a display connected to the SoC, a camera module, an external memory connected to a memory controller of the SoC, and the SoC. The SoC includes the processor, a main bus connected to the processor, a graphic processing unit (GPU) connected to the main bus, a memory controller connected to the main bus, a debugging path bus connected to the processor, and a deadlock controller connected to the debugging path bus. The deadlock controller is configured to detect a deadlock state of the processor, reset the main bus, and extract state information of the processor in the deadlock state.

According to one or more example embodiments, a method for controlling a deadlock of a processor in a system-on-chip (SoC), the SoC including the processor, a main bus, and a memory controller connected to the main bus, the method includes detecting, by a detector, a deadlock state of the processor, the processor being connected to the main bus and a debugging path bus, isolating the processor, which is in the deadlock state, from the main bus, resetting the main bus, extracting, via a debugging circuit in the processor and the debugging path bus, state information of the processor in the deadlock state, resetting the processor while preserving the extracted state information of the processor, and performing a debugging process for the deadlock state of the processor after resetting the processor.

The foregoing general description and the following detailed description are example and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate example embodiments of the inventive concept, and, together with the description, serve to explain principles of the inventive concept.

DETAILED DESCRIPTION OF THE ILLUSTRATED EMBODIMENTS

Figure 1:
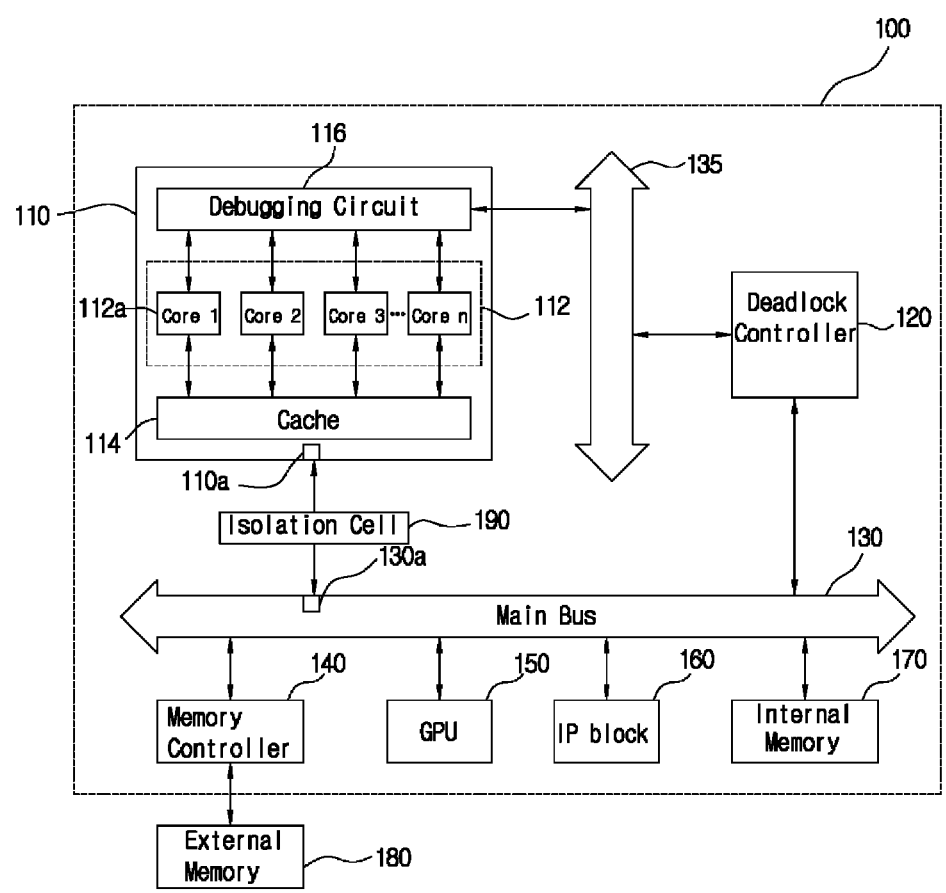
FIG. 1 is a block diagram of a System-on-Chip (SoC), according to one or more example embodiments.

In the following description, for the purposes of explanation, numerous specific details are set forth in order to provide a thorough understanding of various example embodiments. It is apparent, however, that various example embodiments may be practiced without these specific details or with one or more equivalent arrangements. In other instances, well-known structures and devices are shown in block diagram form in order to avoid unnecessarily obscuring various example embodiments.

Unless otherwise specified, the illustrated example embodiments are to be understood as providing example features of varying detail. Therefore, unless otherwise specified, the features, components, modules, units, etc., and/or other aspects of the various illustrations may be otherwise combined, separated, interchanged, and/or rearranged without departing from the disclosed example embodiments. Further, in the accompanying figures, the size and relative sizes of blocks, components, elements, etc., may be exaggerated for clarity and descriptive purposes. Also, like reference numerals may denote like or similar elements.

When a component, module, unit, etc., is referred to as being "on," "connected to," or "coupled to" another component, module, unit, etc., it may be directly on, connected to, or coupled to the other component, module, unit, etc. or intervening components, modules, units, etc. may be present. When, however, a component, module, unit, etc. is referred to as being "directly on," "directly connected to," or "directly coupled to" another component, module, unit, etc., there are no intervening components, modules, units, etc., present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, modules, units, etc., these elements, components, modules, units, etc., are not be limited by these terms. These terms are used to distinguish one element, component, module, unit, etc. from another element, component, module, unit, etc. Thus, a first element, component, module, unit, etc. discussed below could be termed a second element, component, module, unit, etc. without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram of a System-on-Chip (SoC), according to one or more example embodiments.

Referring to FIG. 1, an SoC 100 may include a processor 110, a first bus 130, a second bus 135, a deadlock controller 120, a memory controller 140, a Graphic Processing Unit (GPU) 150, an intellectual property (IP) block 160, and an internal memory 170. The internal memory 170 may be a system memory included in the SoC 100, e.g., a memory connected to the processor 110 through the first bus 130. The IP block 160 may include one or more IP blocks, such as a master IP block and a slave master block.

The processor 110 may include one or more central processing units (CPUs) that process code, instructions, programs, and/or data retrieved from various memories, such as the internal memory 170 and an external memory 180. The external memory 180 may be a memory connected to the SoC 100 through a connection interface, e.g., the memory controller 140 and the first bus 130. The SoC 100 may include various SoC components including the IP block 160 configured to process designated operations and functions, such as one or more application-specific instruction set processors (ASIPs). The processor 110 may control the system of the SoC 100.

The processor 110 may include one or more clusters 112, and each of the one or more clusters 112 may include a plurality of CPU cores including a first CPU core 112*a*. The CPU cores are configured to process instructions of a computer program, a software application, and the like. For example, the CPU cores may fetch instructions and/or data, process the fetched instructions and/or data, and store the data in a register of the CPU cores. The computer program and the software application may be any set of instructions stored in the SoC 100 or outside of the SoC 100. It is also contemplated that the computer program and/or the software application may be software programs developed under a user development environment.

As seen in FIG. 1, the processor 110 includes one cluster 112 including four CPU cores, but example embodiments are not limited thereto. For example, the processor 110 may include multiple clusters. The multiple clusters may include heterogeneous clusters, e.g., a first-type cluster and a second-type cluster. The first-type cluster may be a little cluster and the second-type cluster may be a big cluster, which have relatively high performance CPU cores in comparison with the little cluster. The processing speeds of the cores in the first-type cluster may be slower than the processing speeds of the cores in the second-type cluster.

The processor 110 may further include a cache memory 114 and a debugging circuit 116. According to one or more example embodiments, a plurality of clusters may be connected to a single cache memory, but example embodiments are not limited thereto. The cache memory 114 may temporarily store data that is frequently used, thereby reducing access time to read data from the external memory 180 or the internal memory 170. The cache memory 114 may enhance the processing power of the processor 110 because the CPU cores may access the cache memory 114 more quickly than the internal memory 170 and the external memory 180. For example, the cache memory 114 may include different levels, such as L2 or L3 cache.

The debugging circuit 116 may provide access to the CPU cores for a debugging process based on a debugging control signal. Further, the debugging circuit 116 may obtain state information of the CPU cores of the one or more clusters 112. The debugging circuit 116 may access each of the CPU cores to retrieve values in registers of the CPU cores.

The processor 110 may sequentially read instructions stored in the internal memory 170 or the external memory 180 and perform computing operations according to the instructions per computing cycle. The processor 110 may control other SoC components in SoC 100 based on the computation results.

Further, SoC components connected through the first bus 130, such as the memory controller 140, the GPU 150, the IP block 160, and the internal memory 170, may be controlled by the processor 110. In this manner, the first bus 130 may be a main bus of the SoC, and, as such, the first bus 130 may be referred to, hereinafter, as main bus 130. The SoC components connected through the main bus 130 may communicate with the processor 110 or other SoC components through buses including the main bus 130. The deadlock controller 120 may be connected to the processor 110 through the second bus 135. The deadlock controller 120 may retrieve the values of registers of the CPU cores through the debugging circuit 116. For instance, the deadlock controller 120 may retrieve the values of registers of the CPU cores via the second bus 135.

The various components of the SoC may be connected to the main bus 130 via one or more connection interfaces, such as one or more port interfaces. To this end, the one or more connection interfaces (e.g., connection interface 110*a*, 130*a*) may be configurable to, for instance, isolate various components from the main bus 130, such as isolate the processor 110 from signals, e.g., a reset signal, transferred via the main bus 130. Although illustrated as part of main bus 130, the "configurable aspects" of the connection interface 130*a* may reside in the processor 110, may be a component of a bus controller (not shown) or bus arbiter configured to grant component access to the main bus 130, or may be provided as a combination thereof. It is also noted that the one or more clusters 112 of the processor 110 may assign transactions to one or more of the IP blocks 160 via the main bus 130. The second bus 135 may be a debugging path bus. As such, the second bus 135 may be, hereinafter, referred to as debugging path bus 135. The debugging path bus 135 may be a bus used for a debugging process. In this manner, the debugging path bus 135 may operate in a debugging mode. For example, the debugging circuit 116 of the processor 110 may communicate with the deadlock controller 120 through the debugging path bus 135. It is noted that the debugging path bus 135 may be independent of the main bus 130. That is, the debugging path bus 135 may not be a component of the main bus 130.

The memory controller 140 may provide an interface between the external memory 180 and other internal SoC components including the processor 110. The memory controller 140 may control the external memory 180. The memory controller 140 may control data exchange between the processor 110 and the external memory 180. For example, the memory controller 140, in response to a request of a host processor, e.g., the processor 110, may write data in an address of the external memory 180 or read data from the external memory 180. The host processor may be a processor that operates an operating system (OS), and the processor 110 may serve as a host processor. The host may include master IP blocks, such as a GPU 150 and a display controller, in addition to the processor 110. One or more example embodiments illustrate that processor state information of the processor 110 in a deadlock state is retrieved through the debugging path bus 135; however, such a configuration to retrieve processor state information may be applicable with respect to other types of processors, such as the GPU 150.

The external memory 180 may be storage medium to store various data, such as an operating system (OS), programs, applications, and/or other types of data. The external memory 180 may be a DRAM, but example embodiments are not limited thereto. For example, the external memory 180 may include volatile memories and/or non-volatile memories, e.g., at least one of a flash memory, a phase change RAM (PRAM), a magnetic RAM (MRAM), a resistive RAM (RRAM), and ferroelectric RAM (FeRAM), or even a hard disk drive or any other suitable information repository.

The IP block 160 may be an SoC component configured to perform various functions and operations in the SoC 100, and may be classified into master IP blocks and slave IP blocks as described above. It is also contemplated that the master IP blocks may serve as slave IP blocks, or vice versa. For example, IP block 160 may include direct memory access (DMA), audio controller, display controller as the master IP blocks, and may include universal asynchronous receiver/transmitter (UART), timer, inter-integrated circuit (I$^2$C) controller, and serial peripheral interface (SPI) controller as the slave IP blocks.

The internal memory 170 may include a read-only memory (ROM) and/or a random access memory (RAM). A ROM may store permanent data and/or a program, and may include erasable programmable ROM (EPROM), electrically erasable programmable ROM (EEPROM), and the like. A RAM may be a temporary storage device when power is supplied. For example, a RAM may temporarily store programs, data, and instructions, etc. Examples may include dynamic RAM (DRAM), static RAM (SRAM), etc.

As previously mentioned, the one or more clusters 112 of the processor 110 may assign a transaction to the IP block 160 via the main bus 130. When a software program is running, a deadlock state may occur in the SoC 100. The deadlock state may be a processor deadlock, which includes a deadlock between the processor 110 and at least one of the components in the SoC. The processor deadlock may occur in the process of assigning a transaction generated by the one or more clusters 112 of the processor 110.

For instance, the components in the SoC may include at least one of the main bus 130, the memory controller 140, the IP block 160, and the internal memory 170. When a deadlock state occurs in the SoC 100 as described above, the processor 110 and various other SoC components may fall into a deadlock state, and, thereby, become inoperable. With the processor 110, the main bus 130, and potentially other components of the SoC in a deadlock state, it may be difficult to ascertain the cause of the deadlock state. To resolve the deadlock state, the SoC 100 may be reset. It is noted, however, that if the SoC 100 is reset, state information of the processor 110 will also be reset (or otherwise changed or modified). For example, the values of registers in the CPU cores at the time of the deadlock state may be lost. Loss of such information, however, may result in less efficient debugging of the cause of the deadlock state.

According to one or more example embodiments, the deadlock control unit 120 may be provided to determine a deadlock state of the SoC 100 and to retrieve state information from at least one of the CPU cores 112a. One or more of these processes may be performed before resetting the SoC 100 or processor 110 of the SoC 100. An example operation of the deadlock control unit 120 will be described in more detail with reference to FIG. 2.

Figure 2:
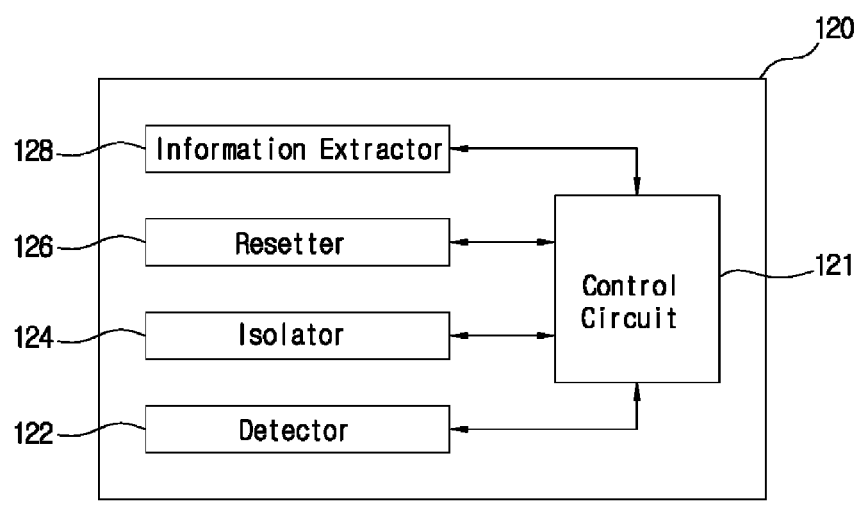
FIG. 2 is a block diagram of a deadlock controller, according to one or more example embodiments.
Figure 3:
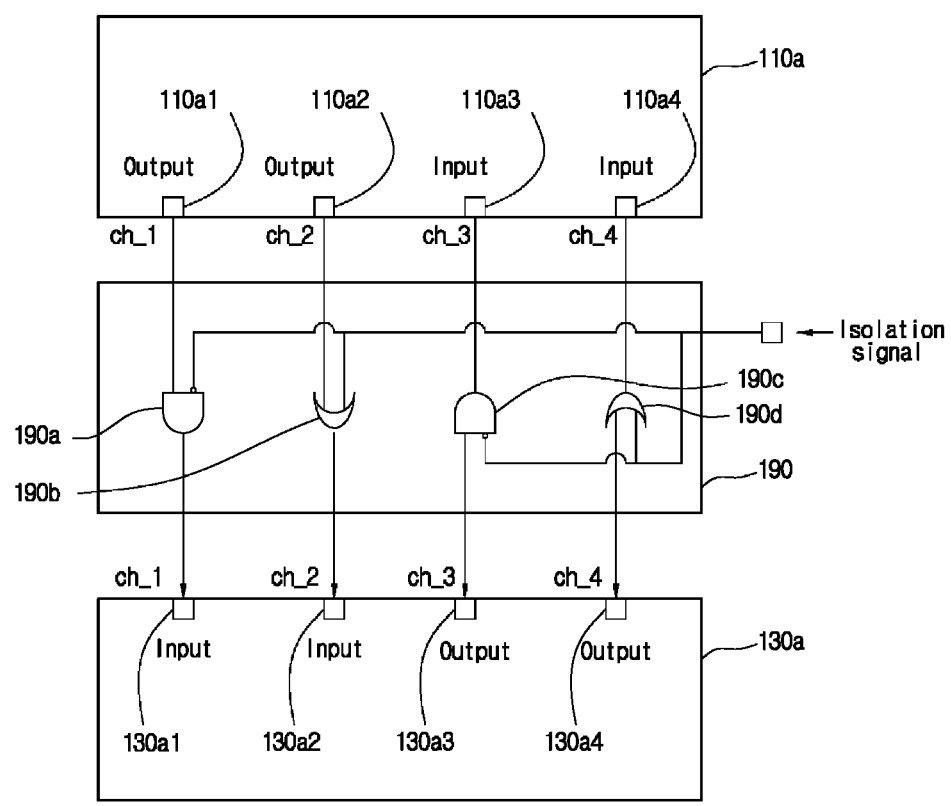
FIG. 3 is a block diagram illustrating an isolation cell of FIG. 1, according to one or more example embodiments.

FIG. 2 is a block diagram of a deadlock controller, according to one or more example embodiments. FIG. 3 is a block diagram illustrating an isolation cell of FIG. 1, according to one or more example embodiments.

Referring to FIG. 2, the deadlock controller 120 may include a control circuit 121, a detector 122, an isolator 124, a resetter 126, and an information extractor 128. One or more of the control circuit 121, the detector 122, the isolator 124, the resetter 126, and the information extractor 128 may be block units configured to perform the operations described herein, and may be implemented as a finite state machine (FSM) or a processor. In other words, the control circuit 121 may be configured to store states of one or more components of the SoC 100, such as one or more states of the processor 110. The states of the components may change in response to triggering conditions, such as a deadlock condition of the processor 110. Given that the deadlock controller 120 is a component of the SoC 100, the control circuit 121, the detector 122, the isolator 124, the resetter 126, and the information extractor 128 may be implemented in a processor or an FSM as noted above.

According to one or more example embodiments, the FSM may include a program and a sequential logic circuit to enable the FSM to perform operations of the control circuit 121, the detector 122, the isolator 124, the resetter 126, and the information extractor 128. If the FSM is implemented as sequential logic circuits, each block unit, e.g., the control circuit 121, the detector 122, the isolator 124, the resetter 126, and the information extractor 128, may be configured as a separate logic circuit to perform the corresponding operation. Further, a logic circuit may be configured to perform two or more operations of the block units. For example, the detector 122 and the resetter 126 may be implemented as a logic circuit, and the isolator 124 and the information extractor 128 may be implemented as separate logic circuits. One or more block units, e.g., the isolator 124 and the information extractor 128, may be implemented as software programs.

The control circuit 121 may control the operations of the detector 122, the isolator 124, the resetter 126, and the information extractor 128. As noted above, the control circuit 121 may be implemented as an FSM. Further, the deadlock controller 120 may be implemented as a processor, and, in this manner, may be referred to as a "deadlock control processor." To this end, the detector 122, the isolator 124, the resetter 126, and the information extractor 128 may correspond to the respective operations of the deadlock control processor.

The unit blocks may be implemented as hardware, software, firmware, or a combination thereof. With respect to software implementation, one or more instructions or computer readable code may be stored on a computer-readable storage medium to perform the operations of the unit blocks. A computer-readable storage medium may include a medium that facilitates the storage and retrieval of data and programs to perform at least one operation of the deadlock control unit 120.

The detector 122 may detect a deadlock state of the SoC 100. For instance, the detector 122 may include a time counter (not shown). The time counter may initialize counting in response to an initialization signal. The initialization signal may be provided periodically, such as provided periodically from processor 110. If the detector 122 fails to receive the initialization signal before the expiration of a time counter (not shown) set in the detector 122, the time counter will expire and operation of the time counter may stop. If the time counter expires, a signal indicating expiration of the time counter may be sent to the control circuit 121. The signal indicating the expiration of the time counter may be a signal for detecting a deadlock state of the SoC 100.

For instance, the SoC 100 may be in a deadlock state while running a software program. In this manner, components of the SoC 100 including the processor 110 may transition into a wait state (or completely stop operation) and, thereby, become non-responsive. In this manner, the SoC component that provides the initialization signal to the time counter may become inoperable in the deadlock state, and, as such, will fail to provide the initialization signal to the detector 122. As such, the signal indicating expiration of the time counter may serve as a signal for detecting the deadlock state of the SoC 100, such as a deadlock state of the processor 110.

The isolator 124 may isolate the processor 110 from the main bus 130 in response to a detection of the deadlock state including a deadlock state of the processor 110. For instance, the isolator 124 may isolate an interface signal of the processor 110 in the deadlock state. In an example, the isolator 124 may include a clamping configuration, e.g., a wiring, to isolate the processor 110 from the main bus 130. By using a clamping operation or other signal retention scheme, an interface signal on the main bus 130 may be fixed, such that a reset signal on the main bus 130 does not affect the interface signal of the processor 110 and the values of registers of CPU cores 112a may remain the same. For instance, the clamping operation or other signal retention scheme may be applied to the communication interface 130a connecting the processor 110 to the main bus 130.

Further, other SoC components including a processor, such as the GPU 150 specifically configured to process graphic processing tasks, may be configured to be isolated from the main bus 130 to extract processor state information in a deadlock state. For example, although not illustrated, an isolation cell similar to an isolation cell 190 of FIG. 1 may be configured between the main bus 130 and the GPU 150. In addition, the debugging path bus 135 may be connected to a debugging circuit of the GPU 150 (not illustrated) such that the deadlock controller 120 may extract the state information of the GPU 150 when the SoC 100 is determined to be in a deadlock state.

Hereinafter, a method of isolating the processor 110 and the main bus 130 will be described according one or more example embodiments. FIG. 3 is a block diagram illustrating an isolation cell of FIG. 1, according to one or more example embodiments.

Referring to FIG. 3, the isolation cell 190 may be implemented between channels connecting a connection interface 110*a* of the processor 110 and a connection interface 130*a* of the main bus 130. For an illustrative example, four channels ch_1, ch_2, ch_3, and ch_4 are implemented by the connection interface 110*a* of the processor 110 and the connection interface 130*a* of the main bus 130, respectively. The isolation cell 190 forwards a signal from the first channel ch_1 of the processor 110 to the first channel ch_1 of the main bus 130 when a first logic gate 190*a* of the isolation cell 190 does not receive an isolation signal having an enabled value '1'. The isolation cell 190 forwards a signal from the second channel ch_2 of the processor 110 to the second channel ch_2 of the main bus 130 when a second logic gate 190*b* of the isolation cell 130 does not receive the isolation signal having an enabled value '1'. The isolation cell 190 forwards a signal from the third channel ch_3 of the main bus 130 to the third channel ch_3 of the processor 110 when a third logic gate 190*c* of the isolation cell 130 does not receive the isolation signal having an enabled value '1'. The isolation cell 190 forwards a signal from the fourth channel ch_4 of the main bus 130 to the fourth channel ch_4 of the processor 110 when a fourth logic gate 190*d* of the isolation cell 130 does not receive the isolation signal having an enabled value '1'. The isolation cell 190 may be configured to receive either an isolation signal having a disabled value '0' or the isolation signal having an enabled value '1'. According to different configurations, the value '0' may be an enabled value, and the value '1' may be a disabled value for the purpose of isolation between the processor 110 and the main bus 130.

The four channels ch_1, ch_2, ch_3, and ch_4 interconnecting the processor 110 and the main bus 130 according to an isolation signal may be implemented by configuring four pads 110*a*1, 110*a*2, 110*a*3, and 110*a*4 in the connection interface 110*a* of the processor 110, and four pads 130*a*, 130*a*2, 130*a*3, and 130*a*4 in the connection interface 130*a* of the main bus 130.

Further, the first and second channels ch_1 and ch_2 are first direction channels through which signals are transmitted from the connection interface 110*a* of the processor 110 to the connection interface 130*a* of the main bus 130. The third and fourth channels ch_3 and ch_4 are second direction channels through which signals are transmitted from the connection interface 130*a* of the main bus 130 to the connection interface 110*a* of the processor 110.

The isolation cell 190 may include logic circuits, e.g., the logic gates 190*a*, 190*b*, 190*c*, and 190*d*. The logic gates 190*a* and 190*c* may be an AND gate including an inverter to invert the received isolation signal, and the logic gates 190*b* and 190*d* may be an OR gate. However, aspects are not limited thereto and there may be various other logic gates, such as a NAND gate, NOR gate, an exclusive OR (XOR) gate, exclusive NOR (ENOR) gate, a NOT gate, and a combination thereof such that the isolation cell 190 performs a signal isolation operation according to the isolation signal.

Referring to FIG. 3, the first channel ch_1 may be formed by connecting the output of the first pad 110*a*1 of the connection interface 110*a* to a first input of the AND gate 190*a* and connecting the output of the AND gate 190*a* to the input of the first pad 130*a*1 of the connection interface 130*a*. As noted above, the isolation signal received by a second input of the AND gate 190*a* may be inverted by an inverter. The third channel ch_3 may be formed by connecting the output of the third pad 130*a*3 of the connection interface 130*a* to a first input of the AND gate 190*c* and connecting the output of the AND gate 190*c* to the input of the third pad 110*a*3 of the connection interface 110*a*. As noted above, the isolation signal received by a second input of the AND gate 190*c* may be inverted by an inverter. The second channel ch_2 may be formed by connecting the output of the second pad 110*a*2 of the connection interface 110*a* to a first input of the OR gate 190*b* and connecting the output of the OR gate 190*b* to the input of the second pad 130*a*2 of the connection interface 130*a*. A second input of the OR gate 190*b* may receive the isolation signal. The fourth channel ch_4 may be formed by connecting the output of the fourth pad 130*a*4 of the connection interface 130*a* to a first input of the OR gate 190*d* and connecting the output of the OR gate 190*d* to the input of the fourth pad 110*a*4 of the connection interface 110*a*. A second input of the OR gate 190*d* may receive the isolation signal.

According to one or more example embodiments, one of the first and second channels ch_1 and ch_2 may not be implemented, and one of the third and fourth channels ch_3 and ch_4 may not be implemented. Accordingly, only two signaling channels may be configured between the processor 110 and the main bus 130 to exchange data signals.

When the AND gate 190*a* receives an isolation signal having a disabled value '0', the second input of the AND gate 190*a* inverts the disabled value '0' to the value '1'. Accordingly, the value of the signal input to the first input of the AND gate 190*a* is output to the first channel ch_1 of the main bus 130. Similarly, when the AND gate 190*c* receives an isolation signal having a disabled value '0', the second input of the AND gate 190*c* inverts the disabled value '0' to the value '1'. Accordingly, the value of the signal input to the first input of the AND gate 190*c* is output to the third channel ch_3 of the processor 110.

When the AND gate 190*a* receives an isolation signal having an enabled value '1', the second input of the AND gate 190*a* inverts the enabled value '1' to the value '0'. Accordingly, regardless of the value of the signal input to the first input of the AND gate 190*a*, the AND gate outputs the value '0' to the main bus 130. The change of the signal value at the first pad 110*a*1 does not affect the input value of the first pad 130*a*1. Thus the signal at the first pad 130*a*1 is retained (signal retention) or fixed. This condition may be referred to as an isolation between the first channel ch_1 of the processor 110 and the first channel ch_1 of the main bus 130. Similarly, when the AND gate 190*c* receives an isolation signal having an enabled value '1', the second input of the AND gate 190*a* inverts the enabled value '1' to the value '0'. Accordingly, regardless of the value of the signal input to the first input of the AND gate 190*c*, the AND gate outputs the value '0' to the processor 110. The change of the signal value at the third pad 130*a*3 does not affect the input value of the third pad 110*a*3. Thus the signal at the third pad 110*a*3 is retained (signal retention) or fixed. This condition may be referred to as an isolation between the third channel ch_3 of the processor 110 and the third channel ch_3 of the main bus 130.

When the OR gate 190*b* receives an isolation signal having an disabled value '0', the value of the signal input to the first input of the OR gate 190*b* is output to the second channel ch_2 of the main bus 130. Similarly, when the OR gate 190*d* receives an isolation signal having an disabled value '0', the value of the signal input to the first input of the OR gate 190*d* is output to the fourth channel ch_4 of the processor 110.

When the OR gate 190*b* receives an isolation signal having a enabled value '1', regardless of the value of the signal input to the first input of the OR gate 190*b*, the OR gate 190*b* outputs the value '1' to second channel ch_2 of the main bus 130. The change of the signal value at the second pad 110*a*2 does not affect the input value of the second pad 130*a*2. Thus the signal at the second pad 130*a*2 is retained (signal retention) or fixed. This condition may be referred to as an isolation between the second channel ch_2 of the processor 110 and the second channel ch_2 of the main bus 130. Similarly, when the OR gate 190*d* receives an isolation signal having a enabled value '1', regardless of the value of the signal input to the first input of the OR gate 190*d*, the OR gate 190*d* outputs the value '1' to the fourth channel ch_4 of the processor 110. The change of the signal value at the fourth pad 130*a*4 does not affect the input value of the fourth pad 110*a*4. Thus the signal at the fourth pad 110*a*4 is retained (signal retention) or fixed. This condition may be referred to as an isolation between the fourth channel ch_4 of the processor 110 and the fourth channel ch_4 of the main bus 130.

According to one or more example embodiments, only signals output from the main bus 130 to the processor 110 may be isolated. More specifically, both the first channel ch_1 and the second channel ch_2 may not have isolation configurations. When the reset of the main bus and SOC components other than the processor 110 is intended to secure the state information of the processor 110, only the second direction channels ch_3 and ch_4 may be isolated by providing the isolation signal.

Referring to FIG. 1 and FIG. 2, according to one or more example embodiments, isolation of the processor 110 via isolator 124 enables other SoC components (including e.g., the main bus 130 and the IP block 160) to be reset without resetting the processor 110. In this manner, the states of the processor 110 may be preserved even though the main bus 130 is reset. As previously mentioned, when the processor 110 is not isolated from the main bus 130, resetting the main bus 130 causes the state information of the processor 110 to be altered. As such, without the isolation, the clusters 112 and the interface signal of the processor 110 are floated by resetting other SoC components, and operations of the reset may not stabilize the SoC components. For example, if the main bus 130 is reset without resetting the processor 110, the state of the processor 110 may be changed when the main bus 130 is reset or after the reset of the main bus 130.

To maintain the state of the processor 110, the isolator 124 may isolate the processor 110 from the main bus 130. The isolator 124 may maintain or fix the interface signal on the processor 110 to keep the transaction status from changing by the reset. For example, the state of the interface signal on the processor 110 is maintained as that in the deadlock state, and the state of the processor 110 does not change by a reset sequence (or signal) on the main bus 130 because the interface signal on the processor 110 remains the same. Clamping or signal retention schemes used in power control, for example, may implement this isolation process as illustrated in FIG. 3.

If another internal memory (not shown) is connected to the deadlock controller 120, the deadlock controller 120 may extract the state information of at least one of the CPU cores, e.g., the CPU core 112*a*, in a deadlock state without resetting the main bus 130 and other SoC components, such as the IP block 160. The deadlock controller 120 may detect a deadlock state of the processor 110 and may extract the state information of CPU cores in a deadlock state and store the extracted state information in the internal memory connected to the deadlock controller 120. However, this configuration requires another internal memory that is reserved for a deadlock state.

The resetter 126 may reset SoC components (other than the processor 110) after the isolation process between the processor 110 and the main bus 130. The resetter 126 may be implemented in association with the operation of the detector 122. The resetter 126 may be configured to reset the all of the components of the SoC 100 (including the processor 110) if the time counter of the detector 122 expires. However, according to one or more example embodiments, the resetter 126 may reset SoC components including the main bus 130 without resetting the processor 110 if, for instance, a debug control bit is set to an enabled bit, e.g., "1", it is contemplated that any other suitable triggering mechanism may be utilized in association with example embodiments described herein. According to one or more example embodiments, the control circuit 121 may set and store the debug control bit in an internal storage of the deadlock controller 120. With respect to the debug control bit, if the debug control bit is set to the enabled bit, the isolator 124 may isolate the processor 110 from the main bus 130, and the resetter 126 may reset SoC components including the main bus 130 without resetting the processor 110. If the debug control bit is set to a disabled bit, e.g., "0", the processor 110 may not be isolated from the main bus 130 and the SoC components including the processor 110 may be reset.

The information extractor 128 may extract state information of at least one of the CPU cores in the one or more clusters 112 of the processor 110 through the debugging circuit 116 and the second bus 135, which is a debugging path bus. The state information may be extracted after the SoC components are reset without resetting the processor 110. If some CPU cores are in a deadlock state while other CPU cores are in a different state than the deadlock state (e.g., not in the deadlock state), the information extractor 128 may extract state information of the CPU cores in the deadlock state. To this end, the information extractor 128 may ignore the state information of the CPU cores in the different state than the deadlock state.

The state information of the CPU cores in the deadlock state may provide information to facilitate analyzing the cause(s) of the deadlock state. In this manner, the state information of the CPU cores in the deadlock state may be used in determining the cause(s) of the deadlock state, reconstructing the state of the deadlock, and/or resolving a problem of the deadlock state. The extracted state information of the CPU cores in the deadlock state may include information stored in registers of the CPU cores in the deadlock state. The registers may include general purpose registers (GPRs), special-purpose registers (SPRs), floating-point registers (FPRs), etc. The SPRs may include program counter (PC), stack pointer (SP), a status register, information, etc. The GPRs may store data and addresses. For example, values associated with arithmetic operations and calculations may be stored in the GPRs. The PC may store the memory address of the next instruction that would have been executed if not for the deadlock state. The SP may store the address of the last program request in a stack, which is a specialized buffer that stores data from the top down.

FIGS. 4 to 9 are block diagrams of a sequential operational flow of an SoC operation, according to one or more example embodiments. FIG. 10 is a flowchart of a process for operating an SoC, according to one or more example embodiments. In this manner, an example process of operating an SoC will be described with reference to FIGS. 1 to 10.

Figure 4:
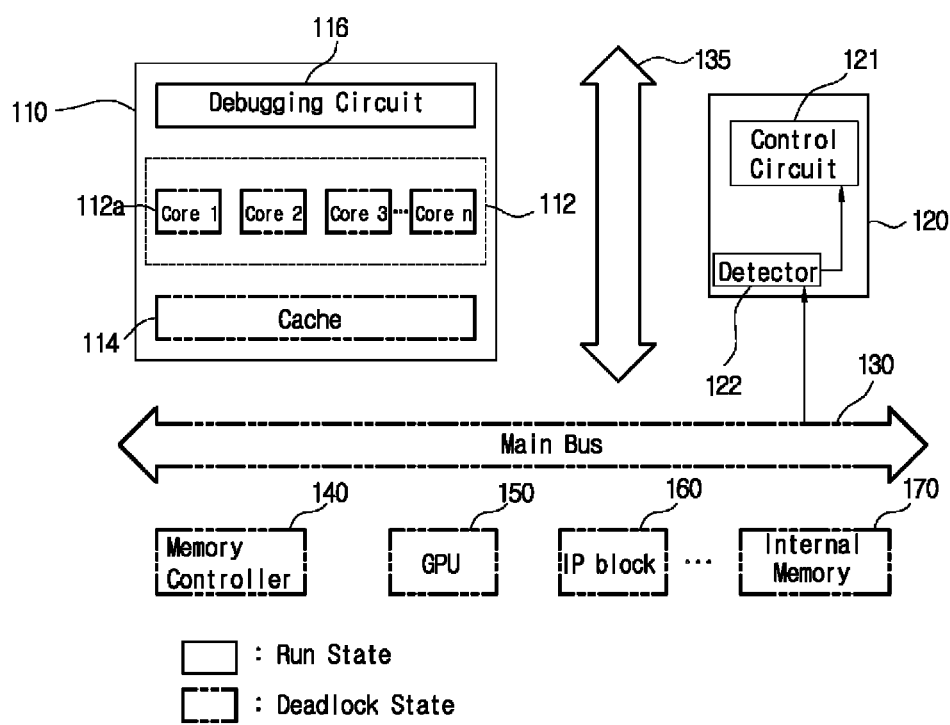
FIGS. 4, 5, 6, 7, 8, and 9 are block diagrams of a sequential operational flow of an SoC, according to one or more example embodiments.

Referring to FIGS. 4 and 10, in operation S100, if a deadlock state in the SoC 100 occurs, the deadlock controller 120 may detect the deadlock state via the detector 122. In an example scenario, while running a specific software program or a programmed logic in the SoC 100, at least one of the CPU cores of processor 110 may be deadlocked, and, thereby, not able to communicate to one or more other SoC components when a transaction generated by the processor 110 is sent. The transaction may be pending permanently if the processor 110 fails to receive a response. This may stall the processor 110 and one or more other SoC components of SoC 100.

According to one or more example embodiments, as long as the deadlock state does not affect debugging logic (e.g., the debugging circuit 116 and the debugging path bus 135 connected to the debugging circuit 116), the deadlock controller 120 may remain operational even when the processor 110 and other SoC components are in a deadlock state (see FIG. 3).

The detector 122 may include a time counter that can be periodically initialized by an initialization signal. If the detector 122 does not receive the initialization signal for a certain period, the time counter will not be initialized, and the time counter will expire according to an expiration setting. If the time counter expires, the detector 122 may send a time counter expiration signal to the controller 121. The time counter expiration signal may correspond to a signal that the SoC 100 is deadlocked.

Figure 5:
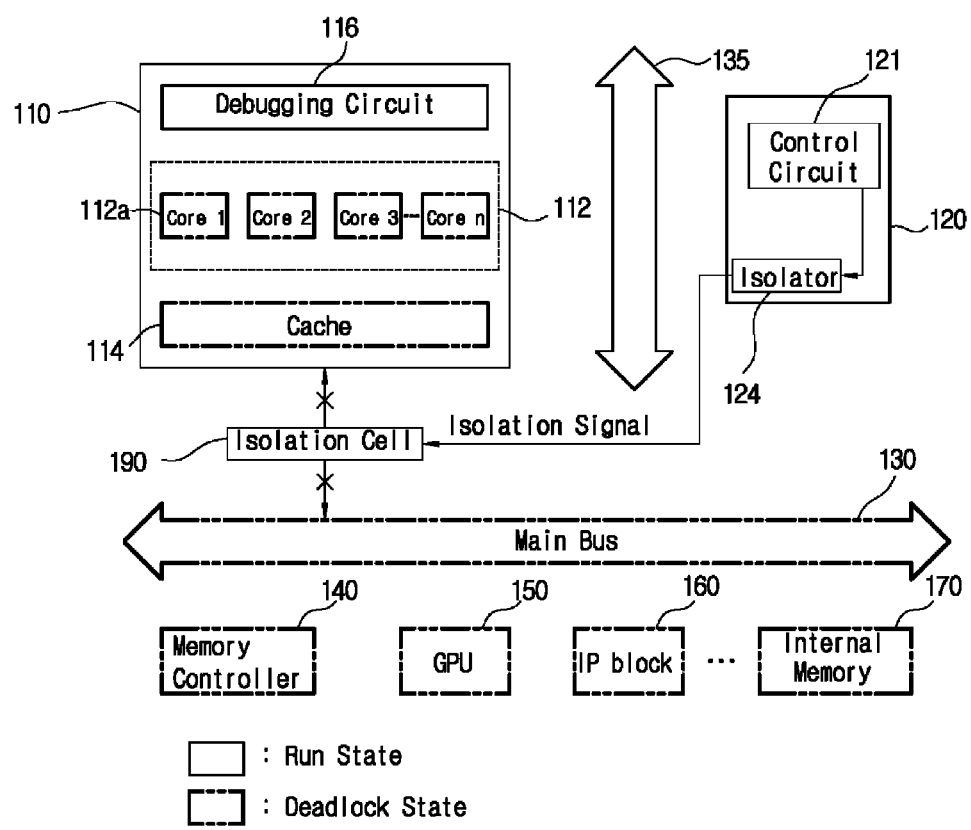

Once detecting the deadlock state of the SoC 100, in operation S110, the processor 110, which may serve as a CPU to operate an operating system, is isolated from the main bus 130, as shown in FIG. 5. For instance, in response to the signal for detecting a deadlock state of the SoC 100, the controller 121 of the deadlock controller 120 may trigger the isolator 124 to transmit the isolation signal to the isolation cell 190 coupled between the processor 110 and the main bus 130 for isolating an interface signal of the processor 110 in a deadlock state. The isolation process may include maintaining the state of the interface signal of the main bus 130 connected to the processor 110 or fixing the interface signal, such that the state of the transaction is not changed. Further, the isolation process may maintain the state of the processor 110 even though a reset sequence is applied on the main bus 130 for resetting the main bus 130 and other components of the SoC 100.

Although FIG. 5 illustrates the isolation between the processor 110 and the main bus 130, the deadlock controller 120 may perform an isolation process between the processor 110 and the debugging path bus 135. However, the isolation between the processor 110 and the debugging path bus 135 may be removed to enable a debugging path after resetting the main bus 130 and other SoC components, such as the internal memory 170 and the IP block 160.

Figure 6:
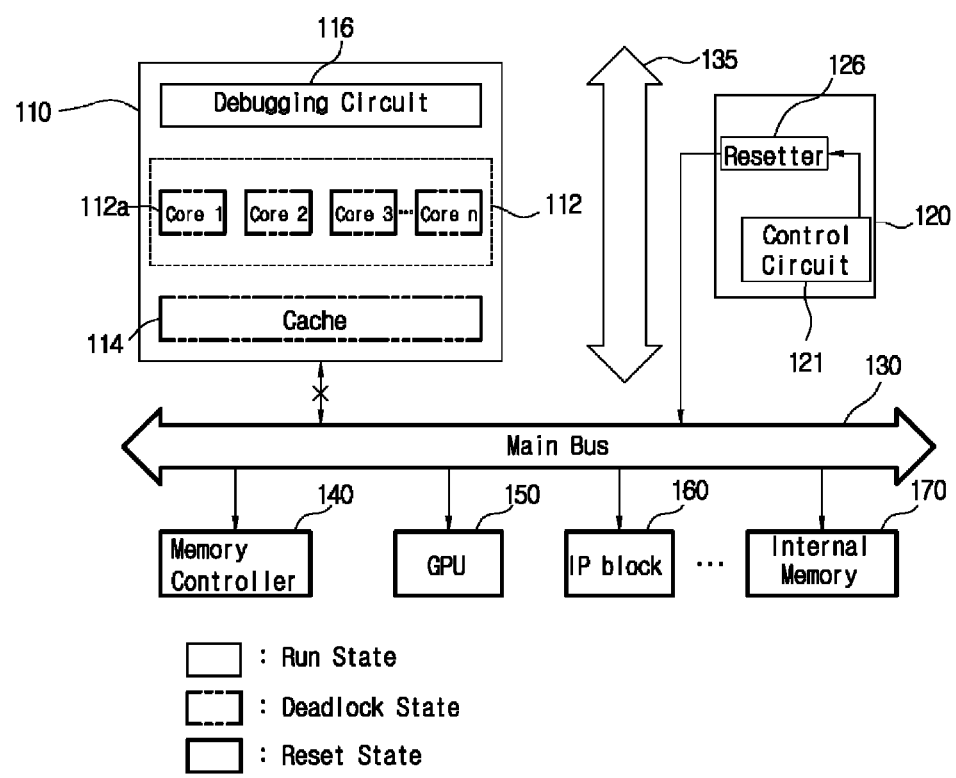

After isolating the processor 110 from the main bus 130, in operation S120, SoC components other than the processor 110 are reset as shown in FIGS. 6 and 10. Referring to FIG. 6, the controller 121 of the deadlock controller 120 may operate the resetter 126 to reset the SoC components other than the processor 110. Even when the processor 110 and a portion of SoC components are in a deadlock state, it may be difficult to identify which SoC component is in a deadlock state because the processor 110 is also in a deadlock state. Thus, if a deadlock state is detected, all SoC components (other than the processor 110) may be reset. That is, because the state of the processor 110 may be changed by resetting the main bus 130 connected to the processor 110, the processor 110 is isolated from the main bus 130 before the reset process shown in FIG. 6 is carried out.

Figure 7:
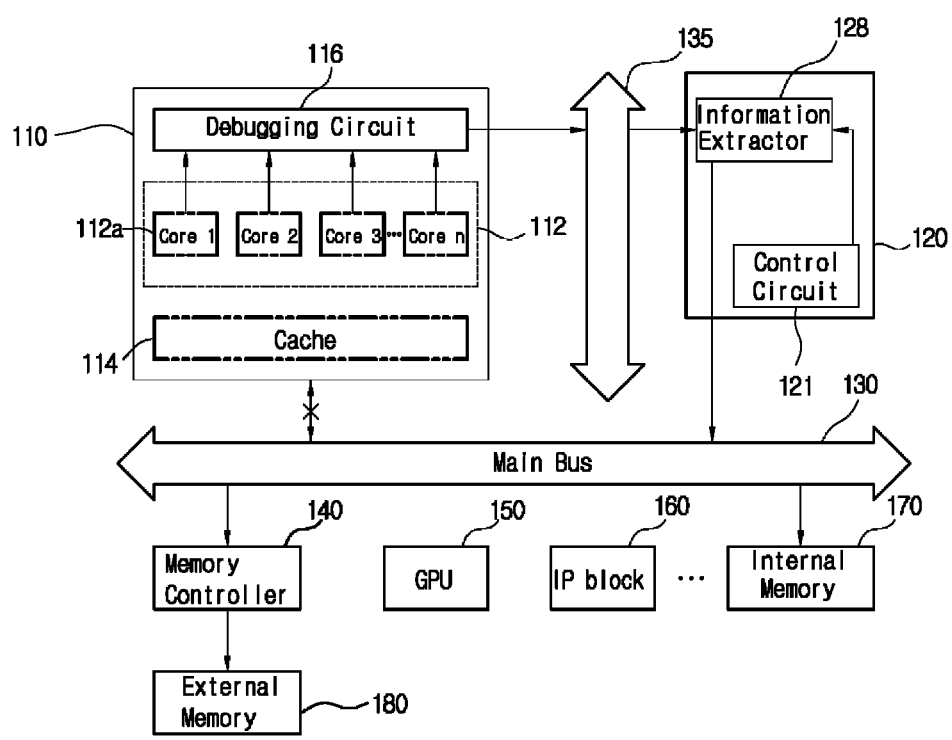

Referring to FIGS. 7 and 10, after resetting the SoC components (other than the processor 110), in operation S130, the deadlock controller 120 may extract state information of at least one CPU core of the processor 110 via the debugging path bus 135 and the debugging circuit 116. The debugging path bus 135 may be independent from the main bus 130, and may not be affected by the state of the main bus 130, e.g., a reset signal applied on the main bus 130. If the debugging path bus 135 has been isolated from the processor 110 in the operation S110, the debugging path bus 135 will be restored to connect to the processor 110 to deadlock control unit 120. As shown in FIG. 6, the control circuit 121 of the deadlock controller 120 may operate the information extractor 128 to extract state information of one or more CPU cores in a deadlock state through the debugging circuit 116 in the processor 110 and the debugging path bus 135.

During the process of extracting the state information, the isolation between the processor 110 and the main bus 130 may be maintained, as shown in FIG. 7. The extracted state information of at least one CPU core may be data stored in registers of the CPU core. For instance, values of a program counter, a general purpose register, a link register, a stack pointer, a state register, and other register may be included in the extracted state information. Further, cache line information may also be extracted. Further, the extracted state information of at least one CPU core may be stored in a memory, e.g., the internal memory 170, which has been reset, in accordance with the control of the deadlock controller 120. As seen in Referring to FIG. 7, the extracted state information may be stored in the internal memory 170 or in the external memory 180 through the memory controller 140.

Figure 8:
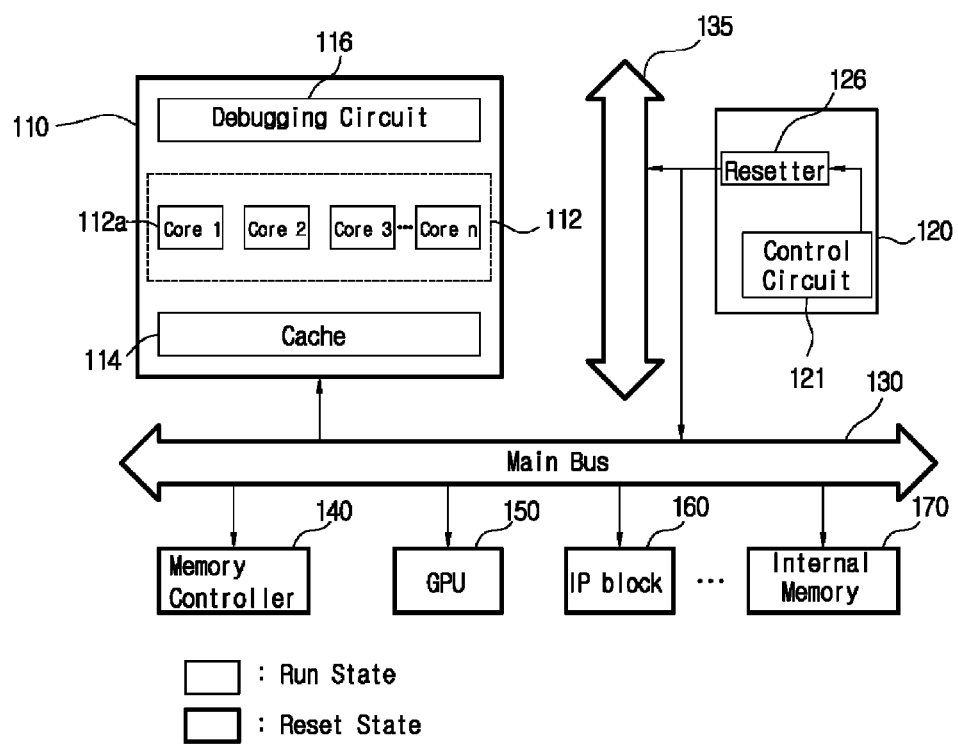

Referring to FIGS. 8 and 10, after extracting the state information of at least one CPU core of the processor 110 in the deadlock state and storing the extracted state information in a memory, the processor 110 may be reset in operation S140. In this manner, other SoC components may be reset again; however, the extracted state information stored in the memory is not reset. For example, when the SoC components are reset in association with operation S140, certain processes may be performed to keep the state information stored in the memory. If the memory is a DRAM, a self-refresh process may be performed to maintain the stored state information after the reset of the SoC.

Figure 9:
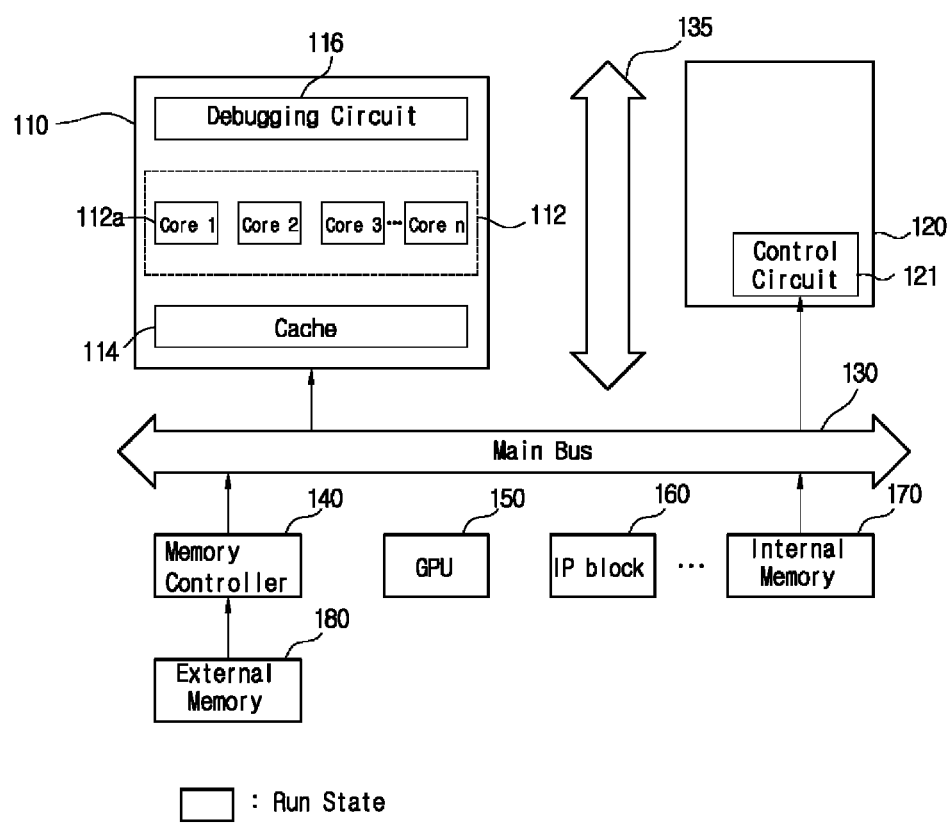
Figure 10:
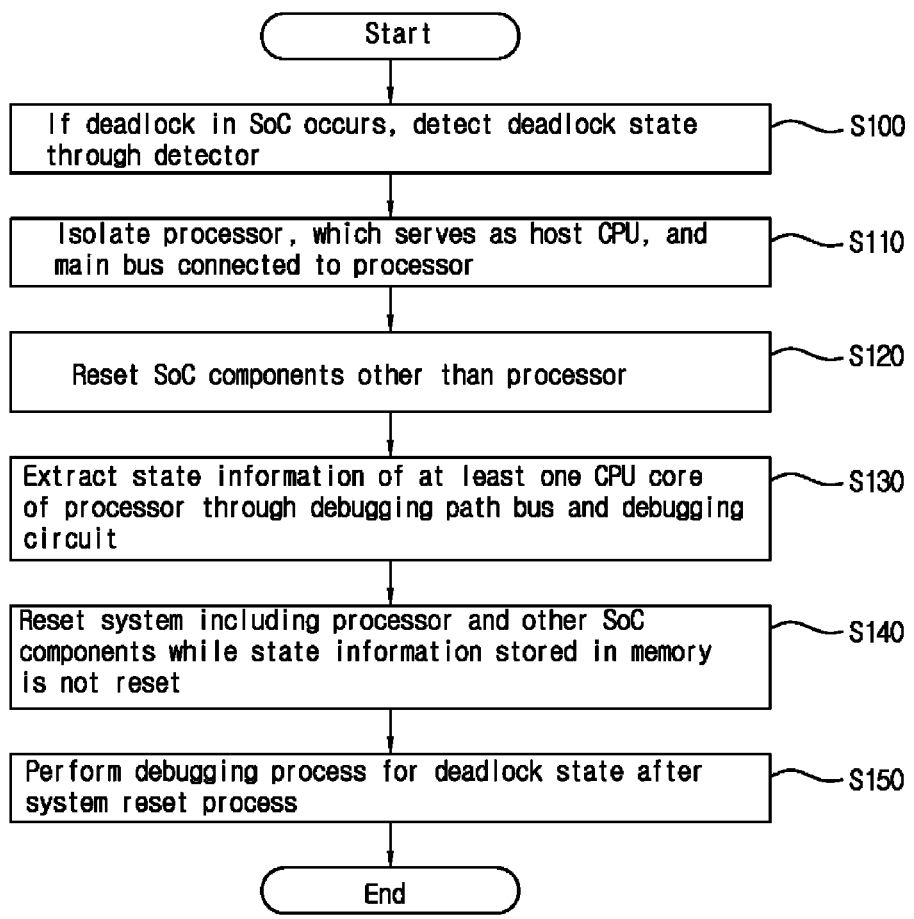
FIG. 10 is a flowchart of a process for operating an SoC, according to one or more example embodiments.

Referring to FIGS. 9 and 10, in operation S150, the deadlock control unit 120 may perform a debugging process to debug the deadlock state after the system reset process of operation S140 is performed. The control circuit 121 may retrieve the state information of at least one CPU core in a deadlock state, and store it in a memory, e.g., the internal memory 170 or the external memory 180 through the memory controller 140.

The debugging process may be performed by an external debugger that may be connected to the SoC 100 through, for instance, a joint test action group (JTAG) interface (not shown). However, according to one or more example embodiments, the deadlock controller 120 may enable a self-debugging process within the SoC 100. For instance, as shown in FIG. 9, the controller 121 of the deadlock control unit 120 may retrieve the state information stored in the memory, e.g., the internal memory 170, and perform a debugging process by analyzing the retrieved state information. The self-debugging process may be performed by a debugging unit other than the control circuit 121. For example, at least one CPU core of the processor 110 (after being reset) may perform the debugging after retrieving the state information from the memory, e.g., the internal memory 170.

An example of the self-debugging process performed in the SoC 100 will be now described in more detail. If the extracted state information of at least one CPU core is stored in a memory, which has been reset (see FIG. 7), the entire SoC may be reset (see FIG. 8), and the processor 110 may be rebooted (see FIG. 9). The rebooting of the processor 110 may not be a normal reboot, but a rebooting process for performing a software sequence to report the previous deadlock state information of the processor 110. For instance, the control circuit 121 of the deadlock controller 120 may analyze causes of the deadlock state based on the state information of the processor 110 stored in the memory 170 and a report from the processor 110. The control circuit 121 may further perform a debugging process to reconstruct the state of the deadlock of the processor 110.

The stored state information of at least one CPU core may be values of a program counter, a stack pointer, a general purpose register, etc., at the time of (or otherwise associated with) the deadlock state of the at least one CPU core. Using the value of the program counter, the address of the program code executed by the corresponding CPU core before the deadlock may be obtained. Further, using the values of general purpose registers and stack pointer, a call stack may be extracted and analyzed to determine how the program code was executed. For instance, utilizing the value of the program counter, it may be identified that a specific instruction for a specific function causes a deadlock. The corresponding address may be identified through values of general purpose registers. Further, utilizing the value of stack pointer, the call path to the corresponding function and data may be identified.

Figure 11:
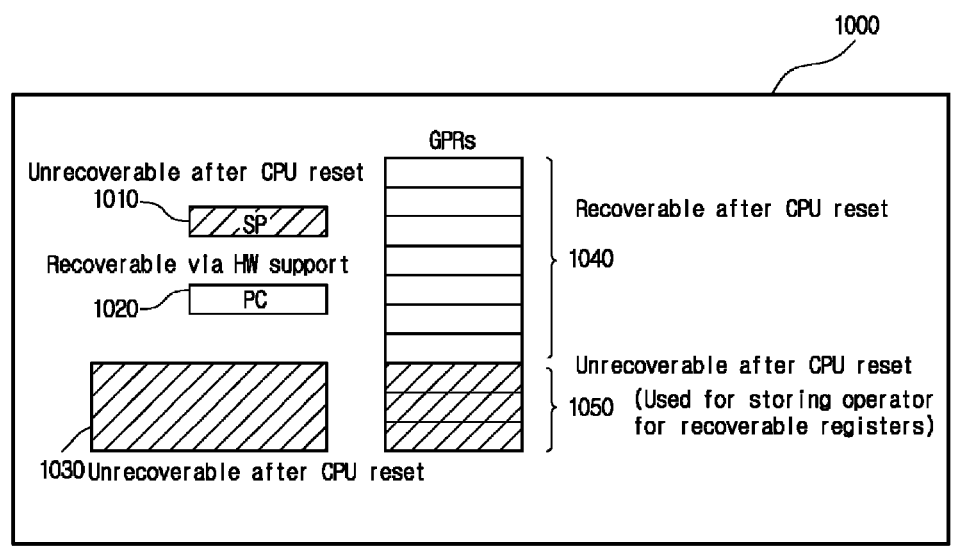
FIG. 11 is a diagram illustrating a CPU core state of a processor after a CPU reset, according to one or more example embodiments.

FIG. 11 is a diagram illustrating a CPU core state of a processor after a CPU reset, according to one or more example embodiments.

As shown in FIG. 11, a CPU core 1000 may be reset from a deadlock state. If the CPU core 1000 is reset, values of some registers and CPU data are changed, corrupted, or removed from the values of the registers and the CPU data at the deadlock state. Although some values of registers of the CPU core 1000, e.g., the value of Program Counter 1020 and values of some general purpose registers (GPRs) 1040, may be recoverable, other values of some registers and CPU data may not be recoverable. For example, the value of Stack Pointer (SP) 1010 and values of other CPU data 1030 may be lost and unrecoverable by the reset of the CPU core 1000. Further, values of some GPRs 1050 may be unrecoverable. Some GPRs among the GPRs 1040 may be used for storing operation for recoverable registers, and state information of such GPRs in the deadlock state may be unrecoverable by the reset of the CPU core 1000 because of the storing operation for recoverable registers. The value of Program Counter (PC) 1020 may be recoverable with a hardware (HW) support, such as an application of an external debugging device; however, the value of PC may also be unrecoverable in certain situations. The values of SP 1010, the other CPU data 1030, and the GPRs 1050 are referred to as unrecoverable CPU data.

Figure 12:
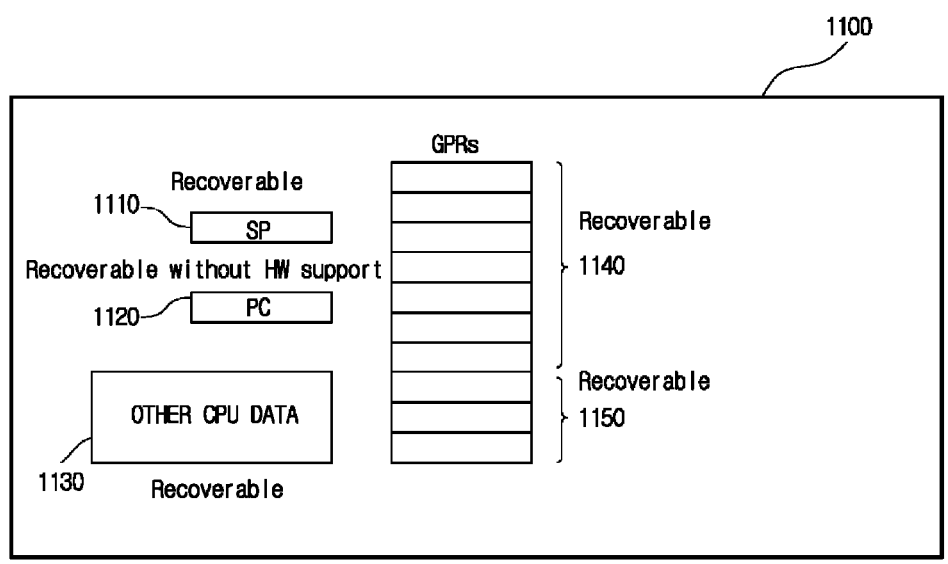
FIG. 12 is a diagram illustrating a CPU core state of a processor in a deadlock state, according to one or more example embodiments.

FIG. 12 is a diagram illustrating a CPU core state of a processor in a deadlock state, according to one or more example embodiments.

Referring to FIG. 12, a CPU core 1100 is in a deadlock state and maintains values of registers and other data at the deadlock state. As described above, the values of Stack Pointer (SP) 1110, Program Counter (PC) 1120, general purpose registers (GPRs) 1140, 1150, and other CPU data 1130 may be recoverable after resetting the CPU core 1100 because such values are extracted and stored in a designated memory, e.g., the internal memory 170 or the external memory 180 of FIG. 1, before resetting the CPU core 1100. For example, values of registers 1150 and other CPU data 1130, such as register values and other CPU data values associated with security, privilege, etc., may be recoverable based on the corresponding values stored in the designated memory for a debugging process. The values of SP 1110, the other CPU data 1130, and the GPRs 1150 are unrecoverable after the reset of the CPU core 1100. Since preservation of these CPU data is valuable in a debugging process, these CPU data may be extracted by a deadlock controller, e.g., the deadlock controller 120 shown in FIG. 1, and stored in a memory for recovery, e.g., the internal memory 170 or the external memory 180 after a reset process.

Figure 13:
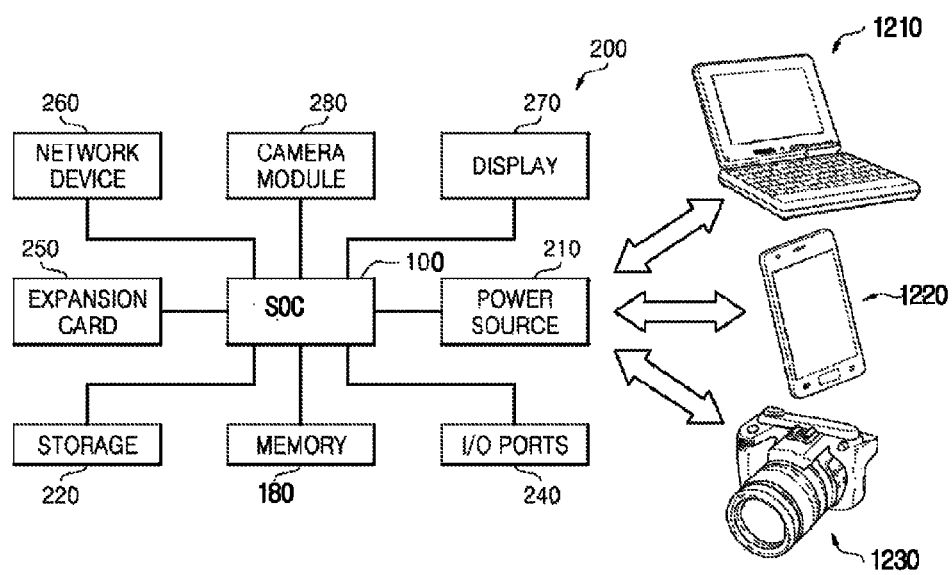
FIG. 13 is a diagram illustrating an electronic device including a SoC, according to one or more example embodiments.

FIG. 13 is a diagram illustrating an electronic device, according to one or more example embodiments.

Referring to FIG. 13, SoC 100 may be used to embody various electronic devices, such as electronic devices 1210, 1220, and 1230, a personal computer (PC), a mobile electronic device, a data server, or the like. The mobile electronic device may be embodied as a laptop computer, a mobile phone, a table PC, a personal digital assistance (PDA), a digital video camera, a portable multimedia player (PMP), a personal navigation device or a portable navigation device (PND), a handheld game console, a mobile internet device (MID), an e-book reader device, or the like.

The electronic device 200, e.g., the electronic devices 1210, 1220, or 1230, may include an SoC 100, a power source 210, a storage 220, an external memory 180, input/output ports 240, a network device 260, and a display 270. It is also contemplated that the electronic device 200 may further include a camera module 280.

The SoC 100 may be the SoC 100 illustrated in FIG. 1, and may be implemented as an application processor (AP). The SoC 100 may include one or more processors including a CPU that operates an operating system. The one or more processors may control the elements 210, 220, 180, 240, 250, 260, 270, and 280. The power source 210 may provide power to at least one of the SoC 100 and the elements 210, 220, 180, 240, 250, 260, 270, and 280.

The storage 220 may be a hard disk drive or a solid state drive. The memory 180 may store program code to control the SoC 100. The memory 180 may be a non-volatile memory or a volatile memory that can store data. For example, the non-volatile memory may include a flash memory, an embedded multimedia card (eMMC), and a universal flash storage (UFS). The volatile memory may include a DRAM.

The input/output ports 240 may be ports for connecting pointing devices, such as a computer mouse or a touch pad, a port for connecting an output device, such as a display 270 or a printer, a port for connecting an input device, such as a keypad or a keyboard, a port for connecting a USB flash drive, etc.

The expansion card 250 may be embodied into a secure digital (SD) card, a multimedia card (MMC), or an eMMC. The expansion card 250 may be a subscriber identification module (SIM) card or a universal subscriber identity module (USIM) card. The network device 260 may be a device for connecting the electronic device to a wired network or a wireless network for communicating between the outside and the electronic device.

The display 270 may be configured to display data output from the storage device 220, the external memory 180, the input/output ports 240, the expansion card 250, and/or the network device 260. The camera module 280 may be a module configured to change an optical image into an electrical image. In this manner, the electrical image output from the camera module 280 may be stored in the storage device 220, the external memory 180, and/or the expansion card 250. In addition, the electrical image output from the camera module 280 may be displayed via the display 270.

Although certain example embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A system-on-chip (SoC) to perform a deadlock control on a processor of the SoC, the SoC comprising:
    the processor comprising a plurality of central processing unit (CPU) cores;
    a first bus connected to the processor;
    a graphic processing unit (GPU) connected to the first bus;
    a memory controller connected to the first bus;
    a second bus connected to the processor;
    an isolation cell comprising a logic circuit configured to retain a signal value input to the processor according to an isolation signal; and
    a deadlock controller connected to the first bus and the second bus, the deadlock controller being configured to:
        isolate the processor, which is in a deadlock state, from the first bus by applying the isolation signal on the isolation cell; and
        extract, via the second bus, state information of the isolated processor in the deadlock state.

2. The SoC of claim 1, wherein the deadlock controller is configured to reset, after isolation of the processor, the GPU and the memory controller connected to the first bus.

3. The SoC of claim 2, further comprising:
    a memory coupled to the first bus,
    wherein the deadlock controller is configured to store the extracted state information in the memory after the reset.

4. The SoC of claim 1, wherein the deadlock controller is configured to reset, after extraction of the state information, the isolated processor.

5. The SoC of claim 4, wherein at least one of the deadlock controller and the reset processor is configured to analyze the deadlock state based on the extracted state information.

6. The SoC of claim 1, wherein:
    the deadlock state is associated with a first CPU core of the plurality of CPU cores; and
    the deadlock controller is configured to extract the state information from the first CPU core, the first CPU core being in a deadlock state.

7. The SoC of claim 1, wherein the deadlock controller is configured to isolate the processor based on status of a debug control bit.

8. The SoC of claim 1, wherein the deadlock controller is configured to isolate the processor based on expiration of a time counter.

9. The SoC of claim 1, wherein the extracted state information comprises a stack pointer value stored in a register of the processor.

10. The SoC of claim 1, wherein:
    the first bus is a main bus; and
    the second bus is a debugging path bus independent of the main bus.

11. The SoC of claim 1, wherein:
    the logic circuit comprises one or more logic gates to receive a signal from the first bus as a first input, to receive the isolation signal as a second input, and to output a signal to the processor.

12. The SoC of claim 11, wherein:
    the one or more logic gates comprise at least one of an AND gate, an OR gate, a NOT AND (NAND) gate, a NOT OR (NOR) gate, an exclusive OR (XOR) gate, an exclusive NOR (ENOR) gate.

13. A mobile terminal comprising a system-on-chip (SoC) to perform a deadlock control on a processor of the SoC, the mobile terminal comprising:
    a display connected to the SoC;
    a camera module;
    an external memory connected to a memory controller of the SoC; and
    the SoC comprising the processor, a main bus connected to the processor, a graphic processing unit (GPU) connected to the main bus, a memory controller connected to the main bus, a debugging path bus connected to the processor; and a deadlock controller connected to the debugging path bus, the deadlock controller being configured to:
        detect a deadlock state of the processor;
        reset the main bus; and
        extract state information of the processor in the deadlock state.

14. The mobile terminal of claim 13, wherein the processor of the SoC comprises:
    a cache memory;
    a plurality of central processing unit (CPU) cores configured to access the cache memory; and
    a debugging circuit configured to:
        access a CPU core among the plurality of CPU cores, the CPU core being in a deadlock state; and
        extract the state information of the CPU core in the deadlock state.

15. The mobile terminal of claim 13, wherein:
    the deadlock controller comprises a time counter configured to count time until expiration of a time counter; and
    the SoC is configured to periodically transmit an initialization signal to the time counter while the processor is in a state different from the deadlock state.

16. The mobile terminal of claim 13, wherein the deadlock controller is configured to isolate, in response to detection of the deadlock state, the processor of the SoC from the main bus.

17. The mobile terminal of claim 16, wherein the deadlock controller is configured to reset the main bus after isolation of the processor from the main bus.

18. The mobile terminal of claim 17, wherein the deadlock controller is configured to store the extracted state information in a memory after the reset.

19. The mobile terminal of claim 15, wherein:
    the deadlock controller is configured to determine whether a debug control bit is enabled;

based on a determination that the debug control bit is enabled and in response to expiration of the time counter, the deadlock controller is configured to:
reset the main bus; and
preserve the deadlock state of the processor.

20. A method for controlling a deadlock of a processor in a system-on-chip (SoC), the SoC comprising the processor, a main bus, and a memory controller connected to the main bus, the method comprising:
detecting, by a detector, a deadlock state of the processor, the processor being connected to the main bus and a debugging path bus;
isolating the processor, which is in the deadlock state, from the main bus;
resetting the main bus;
extracting, via a debugging circuit in the processor and the debugging path bus, state information of the processor in the deadlock state;
resetting the processor while preserving the extracted state information of the processor; and
performing a debugging process for the deadlock state of the processor after resetting the processor.

* * * * *